United States Patent
Seemüller

(10) Patent No.: US 8,146,831 B2
(45) Date of Patent: Apr. 3, 2012

(54) PERSONALISATION OF PORTABLE DATA SUPPORTS

(75) Inventor: Klemens Seemüller, Eching (DE)

(73) Assignee: Giesecke & Devrient GmbH, Munich (DE)

( * ) Notice: Subject to any disclaimer, the term of this patent is extended or adjusted under 35 U.S.C. 154(b) by 619 days.

(21) Appl. No.: 12/300,096

(22) PCT Filed: May 7, 2007

(86) PCT No.: PCT/EP2007/004019
§ 371 (c)(1),
(2), (4) Date: Nov. 7, 2008

(87) PCT Pub. No.: WO2007/128551
PCT Pub. Date: Nov. 15, 2007

(65) Prior Publication Data
US 2009/0140054 A1 Jun. 4, 2009

(30) Foreign Application Priority Data
May 8, 2006 (DE) .......................... 10 2006 021 382

(51) Int. Cl.
*G06K 19/06* (2006.01)
(52) U.S. Cl. ...................................... 235/492
(58) Field of Classification Search .................. 235/379, 235/380, 487, 492
See application file for complete search history.

(56) References Cited

U.S. PATENT DOCUMENTS

| 5,349,649 | A | 9/1994 | Iijima |
| 5,581,708 | A | 12/1996 | Iijima |
| 6,564,995 | B1 * | 5/2003 | Montgomery ................ 235/379 |
| 7,367,047 | B2 * | 4/2008 | Irisawa et al. .................... 726/2 |

FOREIGN PATENT DOCUMENTS

| EP | 0 513 507 A1 | 3/1992 |
| EP | 0 565 389 A1 | 10/1993 |

OTHER PUBLICATIONS

Rankl, W. et al., *Smartcard Handbook*, Chapters 10.3 and 10.4, Wiley & Sons, Aug. 2002, pp. 638-656, XP 002300685.
Rankl, W. et al., *Smart Card Handbook* (3$^{rd}$ Ed)—Smart Card Commands, Wiley & Sons (2003), pp. 434-490, 1045, XP 002365757.

* cited by examiner

*Primary Examiner* — Seung Lee
(74) *Attorney, Agent, or Firm* — Bacon & Thomas, PLLC

(57) ABSTRACT

For personalizing a portable data carrier (1), a selection device (8) of the data carrier (1) analyzes commands (23) which the data carrier (1) receives from a personalization device (20) within the framework of a personalization method. If the commands (23) are recognized by the selection device (8) as belonging to a certain personalization method, the selection device (8) activates that personalization interface (9) of the data carrier (1) that supports said personalization method. The automatic selection of one of a plurality of personalization interfaces (9) installed on the data carrier (1) permits a flexible personalization of the data carrier (1) independently of any proprietary personalization methods.

25 Claims, 2 Drawing Sheets

PERSONALISATION OF PORTABLE DATA SUPPORTS

BACKGROUND

A. Field

The present invention relates to a method for selecting a personalization interface of a portable data carrier and to such a portable data carrier.

B. Related Art

Diverse portable data carriers are known that are personalized for the particular end user for exclusive use by the latter, for example because the data carrier bears confidential information or grants access to certain personal services. Such portable data carriers are in particular chip cards, e.g. in the form of account or credit cards, mobile communication cards or the like. Such portable data carriers are mostly prepared for the intended service, e.g. provision of mobile communication connections or handling of credit card transactions, not directly by the manufacturer, but by an issuer of the data carrier to the end user which is independent of the manufacturer.

Personalization of the data carrier, i.e. unique assignment of the data carrier to an end user by installing personalization data, can fundamentally be effected either by the manufacturer or by the issuer of the data carrier. The-personalization data used are personal data, such as name and address of the end user, or also data generated independently of the person that can be uniquely assigned individually to the end user, such as cryptographic keys, passwords or the like.

The loading of the personalization data into the data carrier is currently effected predominantly by the manufacturer of the data carriers using proprietary personalization methods which for this purpose interact with corresponding proprietary software personalization interfaces set up on the data carriers, The personalization of a data carrier by the issuer thereof is in turn only possible, due to the likewise proprietary personalization technology of the issuers, with data carriers that also comprise proprietary software interfaces of the issuers. Such a proprietary personalization method is described for example in EP 0 565 389 A1.

It is therefore the object of the present invention to show a way of personalizing portable data carriers that is flexible and largely independent of proprietary technologies.

SUMMARY OF THE INVENTION

An inventive portable data carrier comprises a processor, a memory and at least two personalization interfaces which are each coordinated with a certain personalization method so that the data carrier in question can be personalized in at least two different ways by loading personalization data into the memory of the data carrier. The selection of the right personalization interface for a certain personalization method of an issuer and/or manufacturer of the data carrier is carried out by a selection device present on the data carrier, by the selection device recognizing the personalization method in question and selecting that personalization interface that is coordinated with the recognized personalization method.

This has the advantage that the personalization of the data carrier can be carried out by automatic selection of the right personalization interface independently of the data carrier manufacturer's and/or issuer's proprietary personalization method performing the personalization in the particular case. In particular, both the manufacturer and the issuer of the data carrier can alternate between different production and personalization methods or systems without previously changing the configuration of the data carrier or of the personalization interfaces of the data carrier, in order for the particular proprietary personalization method applied to be supported by the data carrier. This permits the manufacturers of such data carriers to react more flexibly to changing requirements for personalization methods and personalization data.

The selection device recognizes a personalization method by the commands received by the data carrier within the framework of personalization, which are part of the personalization method. Said commands arrive via hardware data communication interfaces of the data carrier and are compared by the selection device with reference commands. The reference commands are assigned in each case to one of the personalization methods supported by means of the personalization interfaces and can be stored in a specially provided reference data area of the data carrier memory.

A personalization method is preferably recognized by at least a portion of the commands received in an initial phase of the personalization method. The initial phase of the personalization method can be for example an authentication or initialization phase in which the personalization method or the manufacturer or issuer behind the personalization authenticates itself to the data carrier as being authorized for personalization. In this case the personalization method is recognized by received authentication and/or initialization commands by means of a comparison with corresponding reference authentication commands and/or reference initialization commands. For example, the proprietary personalization method of the chip card manufacturer Giesecke & Devrient (G&D) is always opened with an authentication by the command "Get_Challenge". When the selection device recognizes the "Get_Challenge" it activates for further personalization the corresponding proprietary S&D personalization interface. On the other hand, the personalization methods of the chip card issuer VISA and the EMV consortium (Europay, Mastercard, VISA) for specification of payment cards, said methods currently being in the standardization stage, are always opened by an authentication by means of the command "Initialize_Update". Upon reception of this command the selection device directly activates the corresponding personalization interface. Furthermore, it is possible that commands received in the initial phase which are evaluated by the selection device carry parameters and data to be transmitted to the data carrier that refer in each case to a certain proprietary personalization method or a variant of a personalization method. In this case the selection device evaluates not only the command itself but additionally the parameters thereof in order to activate the relevant personalization interface.

After activation of a personalization interface, the selection device expediently actively disables the particular unactivated personalization interfaces. This mutual exclusion ensures that there are no undesirable disturbances or interactions with an unactivated interface upon loading of personalization data.

After the initial phase of the personalization method, the actual personalization data are written to a special personalization data area in the memory of the data carrier. The personalization of the data carrier can also be divided into a separate prepersonalization and postpersonalization. The prepersonalization can be carried out for example by the manufacturer of the data carrier, while the postpersonalization is performed by the issuer of the data carrier to the end user. Accordingly, it is also possible to perform a division of the data to be loaded into those data that are expediently loaded upon prepersonalization and other data that are better loaded upon postpersonalization. It can thus be expedient to load e.g. the personal personalization data, such as name and address of the end user, by the issuer upon postpersonalization, since the issuer, unlike the manufacturer, has direct access to the end user. The other individualizing personalization data, such as passwords, cryptographic keys or the like, can then already be loaded into the personalization data area 5 by the manufacturer of the data carrier upon prepersonalization.

The personalization data area in the memory of the data carrier can then also be designed with a prepersonalization data area for receiving the prepersonalization data and a postpersonalization data area for receiving the postpersonalization data. To permit such two-level personalization methods to be supported as comprehensively as possible, the data carrier must comprise at least one prepersonalization interface which is coordinated with a standardized prepersonalization method of a manufacturer of the data carrier, and at least one postpersonalization interface which is coordinated with a standardized postpersonalization method of an issuer of the data carrier. Likewise, the selection device must be able to recognize both personalization methods and to activate the suitable personalization interface.

The inventive portable data carriers can fundamentally be any portable data carriers that are personalized for individual and exclusive use by an end user by personalization data and/or initialization data. Such portable data carriers are in particular chip cards, such as credit cards, bank and account cards and mobile communuication cards, secure multimedia cards or the like, but also any other personal data carriers, such as password-protected or biometrically protected USB storage media or the like. In an inventive portable data carrier, the selection device can be designed as a software component which is executable by the processor of the data carrier and can be present either as a conventional application or as an operating system component.

DESCRIPTION OF THE DRAWINGS

Further features and advantages of the invention will result from the following description of different inventive exemplary embodiments as well as further alternative embodiments in connection with the accompanying drawings. Therein are shown.

DETAILED DESCRIPTION OF PREFERRED EMBODIMENTS OF THE INVENTION

Figure 1:
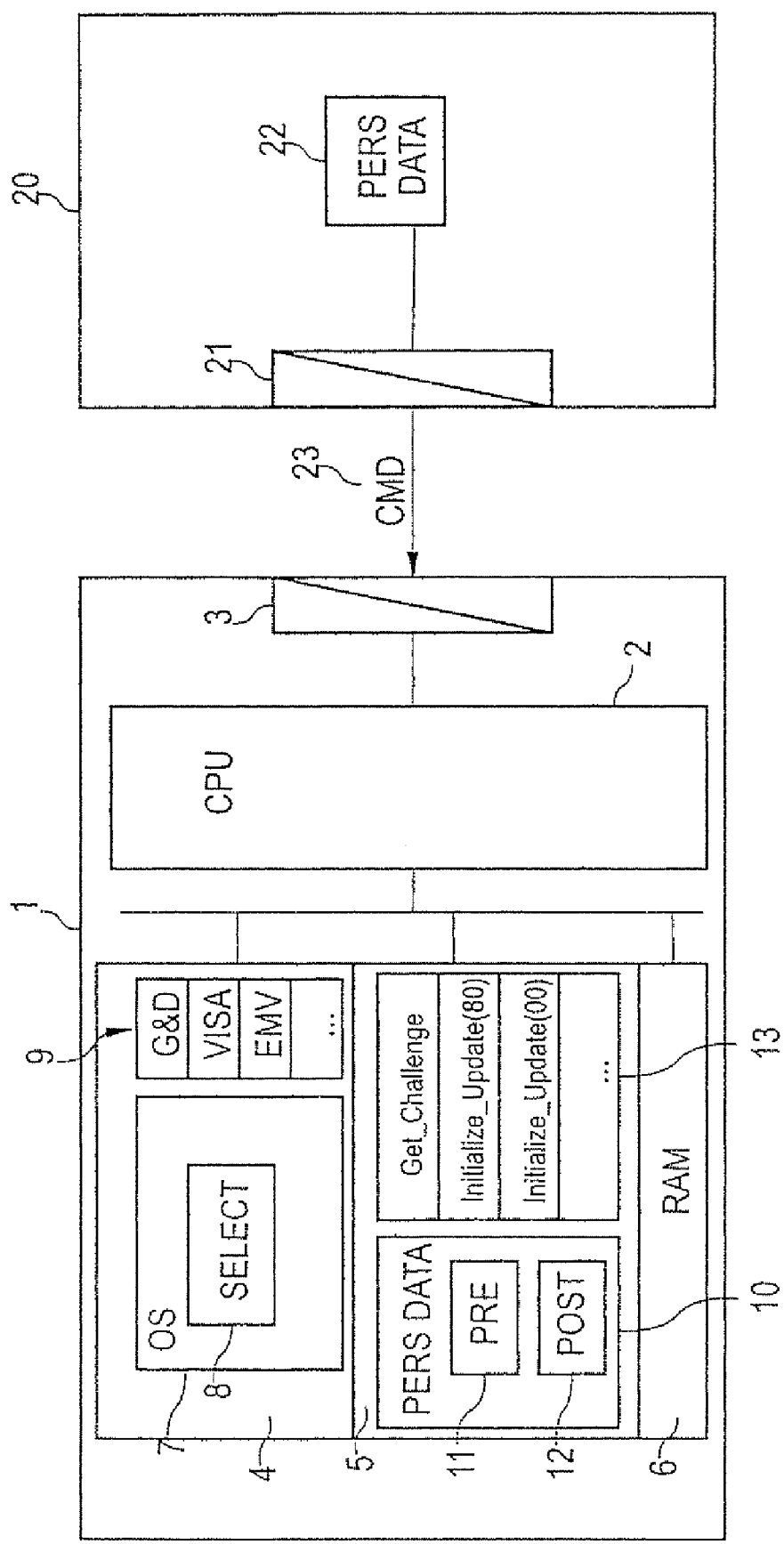
FIG. 1 a portable data carrier designed according to the invention.

FIG. 1 shows a chip card 1 which is designed as an inventive portable data carrier. The chip card 1 possesses the conventional structure with a processor 2 (CPU), a memory assembly comprising a permanent ROM memory 4, a rewritable memory 5 and a RAM working memory 6. The ROM memory 4 contains the data carrier operating system 7 (OS) which includes the inventive selection device 8 (SELECT). Likewise, the selection device 8 could also be designed as a separate component outside the operating system 7 and be present e.g. as an application in the rewritable memory 5.

The ROM memory 4 contains different software personalization interfaces 9 which substantially comprise specifications for processing commands 23 (CMD)) arriving at the data carrier within the framework of a personalization method. In the present example the chip card 1 comprises in particular a personalization interface 9 for a proprietary personalization method of Giesecke & Devrient (G&D) and personalization interfaces for the standardized personalization methods of the credit card organization VISA and the standardization consortium EMV. The personalization interfaces 9 need not necessarily be stored as software components in the ROM memory 4 but can likewise be realized as applications which are located in the rewritable memory 5. The rewritable memory 5 furthermore contains personalization data 10 (PERS DATA) which are divided into prepersonalization data 11 (PRE) and postpersonalization data 12 (POST).

The personalization data 10 comprise all data that are uniquely assigned to the later owner of the chip card 1 or to the chip card 1 itself, and thereby individualize or personalize the chip card 1 with regard to the end user. The personalization data 10 can in particular comprise name and address of the end user but also data assigned to the chip card 1, such as cryptographic keys and the like. In any case the personalization data are card-individual data which make the chip card 1 identifiable and distinguishable from all other chip cards, on the one hand, and uniquely assign the chip card 1 to a certain end user, on the other hand. In this connection the personalizing process constitutes the loading of the personalization data into the personalization data area 10 by a personalization apparatus 20. The basic sequence of personalization of a chip card is described in "Handbuch der Chipkarten", 4th edition, Rankl et al., Hansa-Verlag.

The personalization data can be divided into prepersonalization data which are stored in the prepersonalization data area 11 upon personalization, and postpersonalization data which are stored in the postpersonalization data area 12 upon personalization. In the present example, the prepersonalization data comprise card-individual data which make the chip card I uniquely identifiable but initially allow no inference about the end user. Therefore the prepersonalization data can also be loaded at an early stage by the chip card manufacturer, if the latter does not know the end user's personal data. The end user's personal data then constitute the postpersonalization data which are loaded into the postpersonalization area 12 by the issuer of the chip card 1, for example by a credit card institution or a mobile communication provider. It is of course also possible to load pre- and postpersonalization data into a common personalization data area 10.

Upon personalization of the data carrier 1 by a personalization apparatus 20 by means of a certain personalization method, the selection device 8 recognizes the personalization method in question by the first command 23 transmitted to the chip card 1 or by a selection of the commands transmitted to the chip card 1 in an initial phase of the personalization method. After a first command 23 has been received by the chip card 1 via the data communication interface 3, the selection device 8 compares the received command 23 with reference commands which are stored in a reference data area 13 in the rewritable memory 5. The reference commands are in each case assigned uniquely to one of the software personalization interfaces 9, so that via a recognition of the arriving command 23 that personalization interface 9 coordinated with the relevant personalization method of the personalization apparatus 20 can be immediately activated by the selection device 8. In the present exemplary embodiment, the command "Get_Challenge" is assigned to the G&D personalization interface, while the command "Initialize_Update (80)" is assigned to the VISA personalization interface and the and the command "Initialize_Update(00)" to the EMV personalization interface.

Figure 2:
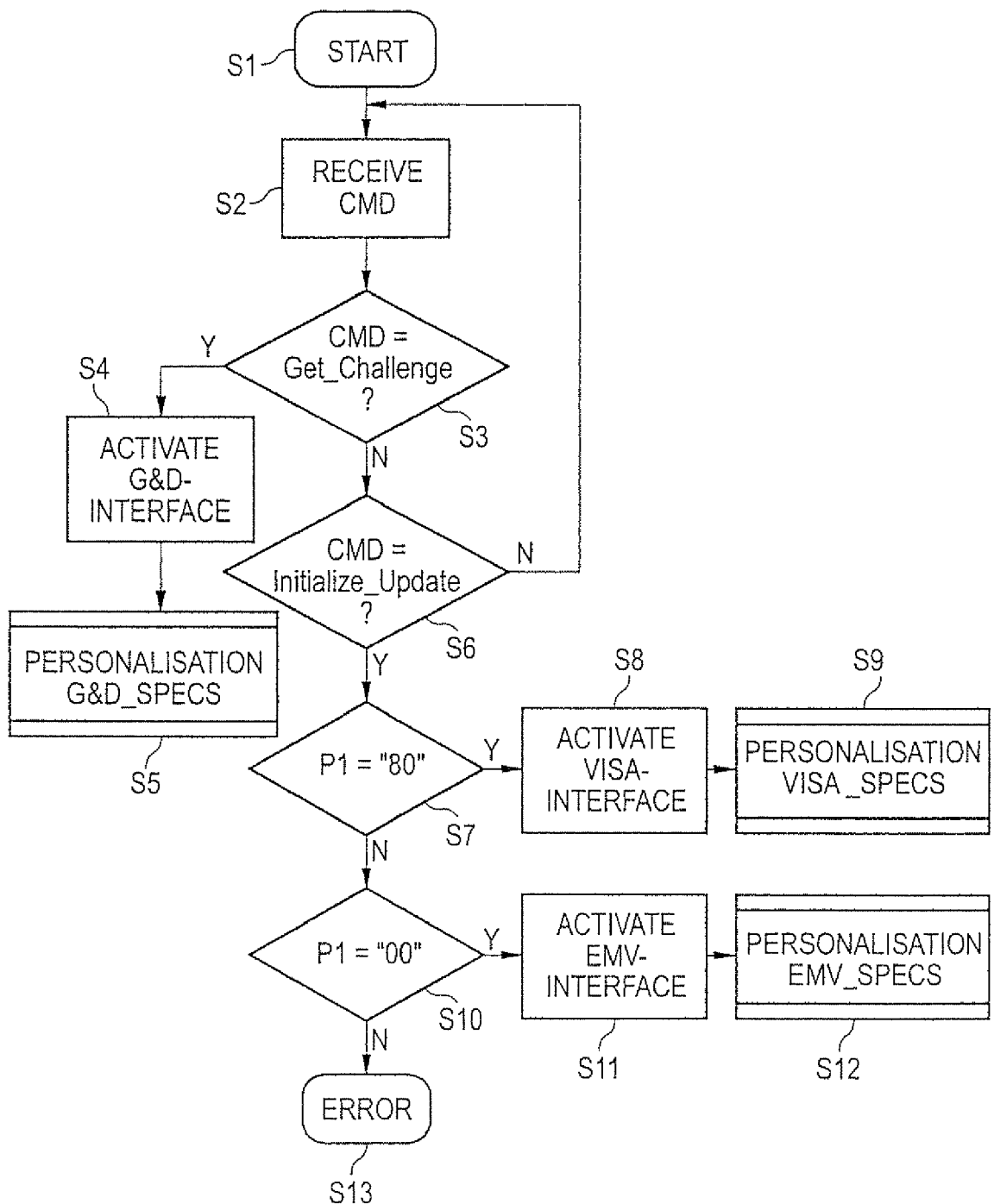
FIG. 2 a flow chart of a method for flexible personalization of a portable data carrier according to FIG. 1.

The procedural sequence of the process of recognizing a personalization method supported by the chip card 1 is shown as a flow chart in FIG. 2. Use is made here of the fact that every personalization method starts with a certain reproducible command sequence. Said command sequence in the initial phase of the personalization method is mostly an external or mutual authentication, whereby the command sequence is to be uniquely assigned to a certain personalization scheme and/or personalization protocol followed by a personalization method, which is implemented on the receiver side of the chip card 1 by one of the installed personalization interfaces 9. In the method illustrated in FIG. 2 the selection device 8 analyzes the initial command sequence arriving via the data communication interface 3 and thereupon activates independently that personalization interface 9 that supports the personalization method used by the personalization apparatus 20.

The method illustrated in FIG. 2 distinguishes in each case between a proprietary personalization method of the chip card manufacturer Giesecke & Devrient (G&D) and between one in each case of a standardized personalization method of the chip card issuer VISA and of the standardization consortium EMV. As soon as the chip card 1 is contacted with the personalization apparatus such that a personalization method can access the chip card 1 for personalization via the corresponding data communication interfaces 21, and 3, the inventive method starts with step S1 (START). In step S2 the chip card 1 receives a first command or a sequence of the initial commands within the framework of the personalization method from the personalization apparatus 20 (RECEIVE CMD). In step S3 it is checked whether the received command corresponds to the command "Get_Challenge" (CMD=Get_Challenge?) which is the first command of the proprietary personalization method of Giesecke & Devrient. If the selection device 8 recognizes the command "Get_Challenge" in step S3, the proprietary G&D personalization interface 9 is activated (ACTIVATE=G&D INTERFACE) and the personalization interfaces of the chip card issuer VISA and of the standardization consortium EMV are disabled in step S4. In step S5 the personalization of the chip card 1 is carried out by loading the personalization data 22 into the personalization data area 10 according to the specification of the activated proprietary personalization interface 9 (PERSONALIZATION G&D_SPECS).

If the command "Get_Challenge" is not recognized in step S3, the method continues with step S6. In step S6 the selection device 8 checks whether the first received command is the command "Initialize_Update" (CMD=Initialize_Update ?). If the command "Initialize_Update" cannot be recognized in step S6, the method branches back to step S1, since it is now clear that the personalization method used by the personalization apparatus 20 is not supported by the personalization interfaces 9 of the chip card 1.

If the command "Initialize_Update" is recognized in step S6, it is checked in step S7 whether a parameter value P1 transmitted with the command has the value 80 (P1="80"). If this is the case, the VISA personalization interface 9 is activated in step S8 (ACTIVATE VISA INTERFACE), and in step S9 the personalization is carried out according to the specification of the recognized VISA personalization method (PERSONALIZATION VISA_SPECS). If in step S7 the parameter P1 did not have the value 80, it is checked in step S10 whether the parameter P1 has the value 00 (P1="00"). If this is the case, the EMV personalization interface 9 is activated in step S11 (ACTIVATE EMV INTERFACE), and in step S12 the personalization is carried out according to the specification of the EMV personalization method recognized by the selection device 8 (PERSONALIZATION EMV_SPECS). The unactivated G&D personalization interface as well as the particular unactivated personalization interface of the chip card issuer VISA or of the standardization consortium EMV are disabled. If the parameter P1 does not have the value 00 in step S10, the inventive method is terminated with an error message in step S13 (ERROR).

The present invention is of course not limited to the three stated personalization methods, but rather it is possible to install alternative or any further personalization methods in the described way as personalization interfaces 9 of a chip card 1.

The invention claimed is:

1. A method for selecting a personalization interface of a portable data carrier for personalizing the data carrier by loading personalization data into a memory of the data carrier by a personalization method, comprising the steps of:
   recognizing the personalization method of the data carrier;
   activating a personalization interface of the data carrier, said interface being coordinated with the recognized personalization method; and
   loading the personalization data into the memory by the personalization method via the activated personalization interface,
   wherein selection of the personalization interface coordinated with the recognized personalization method is performed automatically and independently of personalization methods.

2. The method according to claim 1, wherein the personalization interface coordinated with the recognized personalization method is selected from at least two proprietary software personalization interfaces installed on the data carrier.

3. The method according to claim 1, wherein the personalization method is recognized by commands received by the data carrier in an initial phase of the personalization method.

4. The method according to claim 3, wherein at least a portion of the commands received in the initial phase of the personalization method is compared with reference commands present on the data carrier which are in each case uniquely assigned to a personalization method.

5. The method according to claim 3, wherein at least one of an authentication or initialization of the personalization method with respect to the data carrier is carried out in the initial phase of the personalization method.

6. The method according to claim 3, wherein a "Get_Challenge" command or an "Initialize_Update" command is recognized by the data carrier in the initial phase of the personalization method.

7. The method according to claim 3, wherein the personalization method is recognized by parameters of commands received by the data carrier in the initial phase of the personalization method.

8. The method according to claim 1, wherein the personalization of the data carrier comprises a prepersonalization by loading prepersonalization data by a prepersonalization method, and a postpersonalization by loading postpersonalization data by a postpersonalization method, the prepersonalization being performed by a manufacturer of the data carrier and the postpersonalization by an issuer of the data carrier to an end user.

9. The method according to claim 8, wherein data carrier-individual personalization data are loaded into the memory upon prepersonalization, and person-individual personalization data of the end user of the data carrier upon postpersonalization.

10. The method according to claim 1, including implementing and executing the method on a chip card.

11. A portable data carrier, comprising
    a processor, a memory and a personalization interface which is coordinated with a personalization method which loads personalization data from outside the data carrier into the memory upon a personalization of the data carrier, at least one further personalization interface which is coordinated with a further personalization method, and a selection device which is configured to recognize a personalization method carrying out the personalization and to activate, for loading the personalization data, the personalization interface coordinated with the recognized personalization method, wherein the selection device is further configured to automatically select the personalization interface coordinated with the recognized personalization method independently of personalization methods.

12. The data carrier according to claim 11, wherein the at least two personalization interfaces are proprietary software interfaces which are coordinated with standardized personalization methods of a manufacturer of the data carrier or of an issuer of the data carrier to an end user.

13. The data carrier according to claim 11, including a data communication interface and wherein the selection device is configured to recognize a personalization method by commands received in an initial phase of the personalization method via the data communication interface.

14. The data carrier according to claim 13, wherein the memory has a reference data area set up therein which contains reference commands which are in each case uniquely assigned to one of the personalization methods with which the at least two personalization interfaces are coordinated, and in that for recognizing a personalization method the selection device is configured to compare at least a portion of the commands received in the initial phase of the personalization method with the reference commands.

15. The data carrier according to claim 13, wherein the reference commands comprise at least one of authentication commands or initialization commands, and the selection device is configured to recognize the pertinent personalization method by at least one of authentication commands or initialization commands received in the initial phase.

16. The data carrier according to claim 13, wherein the reference commands comprise at least one of a "Get_Challenge" command or an "Initialize_Update" command, and the selection device is configured to recognize the pertinent personalization method by a "Get_Challenge" command or "Initialize_Update" command received in the initial phase.

17. The data carrier according to claim 13, wherein the selection device is configured to recognize the personalization method by parameters of commands received in the initial phase of a personalization method.

18. The data carrier according to claim 11, wherein the memory comprises a personalization data area which is configured to receive personalization data written by the recognized personalization method via the activated personalization interface.

19. The data carrier according to claim 11, wherein the selection device is configured to recognize a prepersonalization method carrying out a prepersonalization and to recognize a postpersonalization method carrying out a postpersonalization.

20. The data carrier according to claim 19, wherein the personalization data area comprises a prepersonalization data area which is configured to receive prepersonalization data written by the recognized prepersonalization method, and comprises a postpersonalization data area which is configured to receive postpersonalization data written by the recognized postpersonalization method.

21. The data carrier according to claim 20, wherein the prepersonalization data area is configured to receive data carrier-individual prepersonalization data, and the postpersonalization data area is configured to receive person-individual postpersonalization data of an end user of the data carrier.

22. The data carrier according to claim 19, wherein at least one proprietary personalization interface is coordinated with a standardized prepersonalization method of a manufacturer of the data carrier, and at least one other personalization interface is coordinated with a standardized postpersonalization method of an issuer of the data carrier.

23. The data carrier according to claim 11, wherein the selection device is a software component executable by the processor.

24. The data carrier according to claim 11, wherein the selection device is integrated in an operating system of the data carrier.

25. The data carrier according to claim 11, wherein the data carrier comprises a chip card.

* * * * *